स्टेट्स Patent Office  3,486,778
Patented Dec. 30, 1969

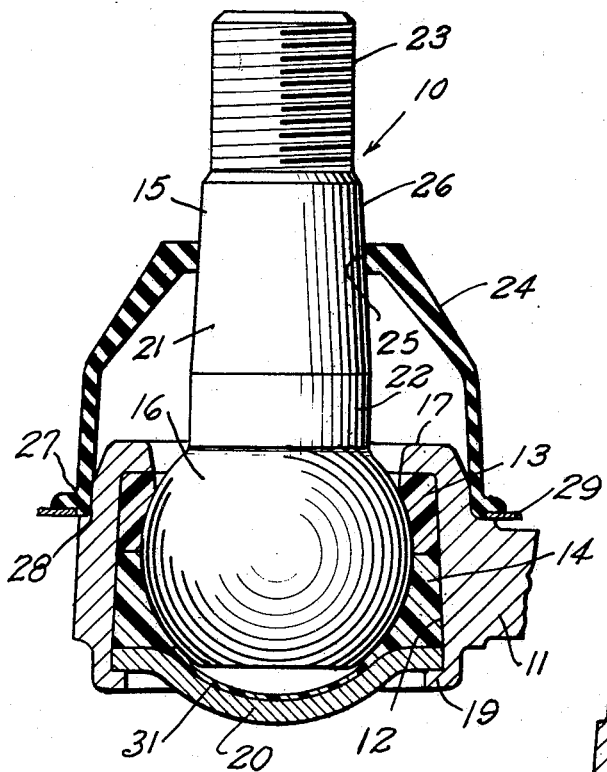
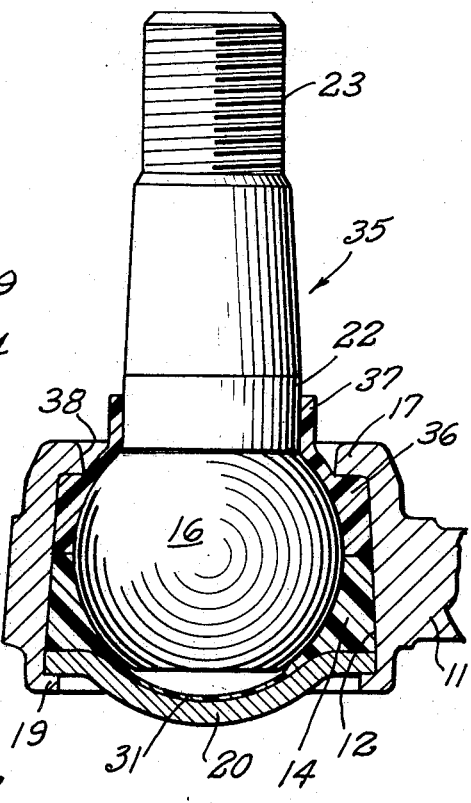
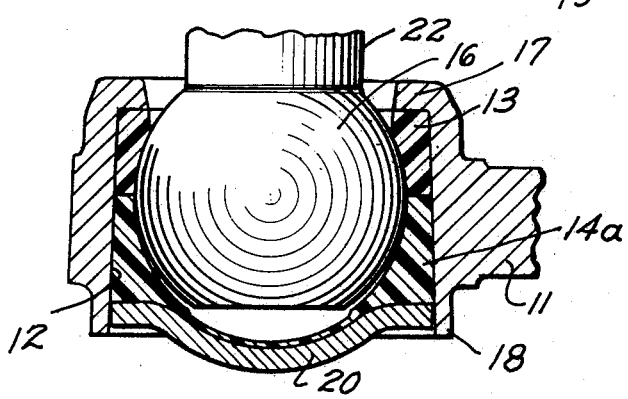

3,486,778
BALL AND SOCKET JOINT
Edward J. Herbenar, Detroit, and Richard Cass, Birmingham, Mich., assignors to TRW Inc., Cleveland, Ohio, a corporation of Ohio
Filed Aug. 3, 1967, Ser. No. 658,116
Int. Cl. F16c 11/06
U.S. Cl. 287—87                        2 Claims

ABSTRACT OF THE DISCLOSURE

A ball and socket joint for automotive wheel suspension and steering linkages having the ball member enveloped in a preformed plastic bearing consisting of two halves which, in turn, are enveloped by a rigid socket housing. One of the bearing halves being made of a plastic material such as nylon which has a high resistance to cold flow and is disposed in the socket housing in a position to carry or support the load transmitted by the ball to the housing. The second bearing half is made of a material such as a high density linear ethylene copolymer plastic or a polypropylene copolymer resin having a property of high resiliency and is disposed in the rigid socket housing in a compressed position to act as a wear take-up portion for the joint. One of the halves has a thin flexible bottom wall extending around the bottom of the ball portion to act as a closure seal of the interior of the bearing at an end of the housing opposite to end from which the stud projects. The other bearing half positioned adjacent to the stud of the ball may be provided with an annular sealing lip to seal the bearing surface from the entrance of dirt and moisture about the stud.

BACKGROUND OF THE INVENTION

Field of the invention

This invention pertains to a ball and socket joint for use in an automotive wheel suspension and steering linkage.

Prior art

Ball joints employing a polyethylene plastic as a bearing socket which is disposed under compression in the cavity of the rigid socket housing so that it will engage the ball portion of the joint are known in the prior art as shown by U.S. Patent No. 3,249,375, issued to Herbenar. Ball and socket joints in which a molded bearing socket of a high density linear polyethylene is in a compressed state so that wear between the bearing surfaces of the ball and socket bearing will be taken up by the cold flow of the plastic material are disclosed in the copending Herbenar patent application entitled "Preload Capsule Joint," Ser. No. 450,616, now U.S. Patent No. 3,413,023. The polyethylene plastic socket of both the patent and the copending application form a ball joint which has permanent or extended lubrication.

SUMMARY OF THE INVENTION

In both of the joints disclosed by the Herbenar patent and the copending application, the constant loading of the bearing surfaces by the ball especially if a tensile loading will cause a portion of the plastic bearing socket because of its cold flow properties to be extruded between the ball and the rigid housing and out of the cavity of the housing.

The present invention overcomes this problem by providing that the plastic bearing socket be divided into two preformed or molded halves or portions, one is the load carrying portion and is made of a stable plastic resin such as nylon which has the property of a high resistance to cold flow. The other or second portion or half is made of polyolefin resin such as a high density linear polyethylene resin or polypropylene copolymer resin to provide the resiliency necessary for wear take-up between the bearing surfaces.

Accordingly, it is an object of the present invention to provide an isolated articular joint having a non-metallic bearing with permanent or extended lubrication and capable of carrying a continuously applied high load.

Another object of the present invention is to provide an isolated articulate joint having a non-metallic bearing composed of two bearing portions one of which acts as a wear take up portion and the other of which acts as a load supporting portion for a continuously applied load.

A still further object of the present invention is to provide an isolated articular joint having a non-metallic bearing composed of two bearing portions, one of which acts as a wear take up portion and is composed of a highly resilient resin, the other of which is formed from a stable resin having a high resistance to cold flow and is capable of supporting a continuously applied high load.

Yet another object of the present invention is to provide an isolated articulate joint having a permanently or extendedly lubricated non-metallic bearing which consists of a load supporting portion made of a resin having the physical properties of nylon and a wear take up portion made of a polyolefin resin having the physical properties of high density linear ethylene copolymers.

A still further object of the present invention is to provide an isolated articulate joint having a non-metallic bearing which has an extending lip which engages a part of the joint to form a seal between the part and the non-metallic bearing.

Many other advantages, features and additional objects of the present invention will become manifest to those versed in the art upon making reference to the detailed description and the accompanying sheets of drawing.

ON THE DRAWINGS

FIG. 1 is a side elevation with parts in section for purposes of illustration of the joint of the present invention;

FIG. 2 is a side elevation of the joint of FIG. 1 showing the bearing parts in the assembled position prior to the final step of assembly; and FIG. 3 is a side elevation showing another embodiment of the joint configuration of the present invention.

AS SHOWN ON THE DRAWINGS

The principles of the present invention are particularly useful when embodied in a ball joint generally indicated at 10 which comprises a metal housing 11 having a cavity 12 in which bearing halves or portions 13 and 14 are inserted, and a ball stud 15 having a ball portion 16 received and carried by the bearing halves 13 and 14. The housing 11 has an inwardly extending annular flange 17 at one end of the cavity 12 on which the bearing half 13 abuts. At an opposite end to the flange 17 the cavity 12 has an annular lip 18, best shown in FIG. 2, which is spun, or peened into an inwardly extending flange 19 to hold a closure plate 20 in the assembled position.

The ball stud 15 has a cylindrical stem 21 having a reduced portion 22 adjacent to the ball portion 16 and a threaded portion 23 at an end opposite the ball portion 16 for engagement with a portion of a steering linkage. The ball portion 16 as illustrated has a substantially spherical surface; however, the surface may be toroidal like the ball surface disclosed in the above-mentioned, co-pending Herbenar application which disclosure is incorporated by reference thereto.

The ball joint 10 is provided with a flexible seal 24 having an opening 25 which tightly engages a tapered portion 26 of the stem 21, and has an annular flange 27 engaged on a shoulder 28 of the housing 11. The flange 27 of the flexible seal 24 is provided with a resilient metallic ring 29 which urges the flange 27 into tight engagement with the shoulder 28 of the housing to provide a tight sealing fit. The lower bearing portion 14 is provided with a web 31 which extends along the closure plate 20 to seal the bearing surfaces from dirt and moisture which may enter the housing cavity around the plate 20. The cooperation of the flexible seal 24 and the web 31 isolates the bearing surfaces of the joint from moisture from the outside and keeps the lubricant applied to the bearing surface in the joint.

In the above-mentioned patent and application, it is stated that a high density linear polyethylene plastic is desirable as the bearing material to form the socket of the ball joint assembly, especially those used for steering linkages. One difficulty encountered by the use of a polyethylene plastic is that when the ball stud 15 is placed in continual tension loading the plastic material will extrude between the ball and the annular lip 17. By dividing the socket bearing into two preformed or molded portions, a load carrying portion 13 and a wear take up portion 14 and by using a more stable high tensile load carrying plastic for the load carrying portion 13, the above-mentioned difficulty is eliminated. The wear take up bearing portion or half 14 is made of a material such as high density polyethylene that is resilient so that while under compression in the assembled joint it will expand to take up any wear created on the bearing surfaces.

In selecting the materials for the bearing halves 13 and 14, it is necessary that the plastic have a low coefficient of friction so that the bearing surfaces require a minimum amount of lubrication and if assembled with a lubricant will not require any additional lubrication for any extended period of time.

In selecting a material for the load supporting or carrying bearing portion, a stable high tensile load carrying plastic such as linear polymeric has been found satisfactory in meeting the requirements for both the bearing function and to prevent the undesired extrusion. A particularly useful linear polymeric resin is a nylon material having the following range of physical properties:

Tensile strength _____ p.s.i__ 10,000–20,000
Elongation _____ percent (max.)__ 300
Flexural modulus _____ p.s.i__ 140,000–1,000,000
Deformation under load (2,000 p.s.i. at 122° F.)
                                        percent (max.)__ 2
Shear strength _____ p.s.i__ 6,200–12,000

Nylon resins sold under the trademark "Zytel" by Du Pont are useful for the load supporting bearing portion, especially "Zytel 101" with .2% water and "Zytel 109" with .2% water, both of which fall within the above range of physical properties.

Other nylon resins produced by Celanese Corp., and Allied Chemicals, including glass fiber reinforced nylons, and which fall within the above range of physical properties may also be used for the load supporting portions. Acetyl resins, especially those manufactured by Du Pont under the trademark "Delrin" are another group of resins useful for the load bearing half or portion. Another group of useful resins which may be used for the load carrying block are the polyphenylene oxide resins which includes modified polyphenylene oxide resin manufactured by General Electric and sold under the trademark "PPO" and "Noryl." (It should be noted that Noryl has a tensile strength of approximately 9,600 p.s.i.)

Suitable materials for the wear take up portion of the bearing are high density olefin copolymers and high density polyolefin materials, which are manufactured and sold by Phillips Chemical Company under the trade name "Marlex," which includes high density ethylene copolymers and polypropylene copolymers. The high density ethylene copolymers Malex resin designated "Marlex" 5002 and 5003 have been found to be especially useful. The range of physical properties of these resins are listed below.

Density _____ gm./cc__ .95
Melt index _____ .2–.3
Tensile strength _____ p.s.i__ 3800–4700
Impact strength _____ ft. lbs./in. notch__ 2–4
Flexural modulus _____ p.s.i__ 155,000–165,000
Hardness (Shore D) _____ 65–70

Other suitable ethylene copolymer materials for the wear take up bearing portion or half of this invention is "Alathon" manufactured by Du Pont. The high density Alathons, such as No. 7622 are very useful. These materials have exceptional stiffness and resistance to environmental stresses as well as high heat resistance and good molding characteristics. "Forti-Flex" B–50–20R sold by Celanese Plastics Company is another suitable copolymer which may be used for the wear take up block or portion.

The polypropylene copolymers have also been found satisfactory for the wear take up portion, an example being the polypropylene copolymers sold under the trade name "Marlex" and having physical properties which fall within the range of properties listed below:

Density _____ gm./cc__ 0.89–.905
Tensile strength _____ p.s.i__ 2900–4500
Impact strength _____ ft. lbs./in. notch__ 1.1–12.0
Flexural modulus _____ p.s.i__ 400,000–600,000
Hardness (Rockwell R) _____ 50–96

The resins identified above for use as the bearing halves 13 and 14 each are characterized by having a low coefficient of friction with the metal ball 16. The resin used for the load bearing half 13 has a property of being resistant to cold flow while under a continual loading. The resins used for the wear take up bearing have a property of high resiliency and will flow and expand about the ball portion 16 to maintain the surfaces of the ball portion in contact with the surface of the bearing halves 13 and 14 whlie the surfaces become worn.

The load bearing half 13 is molded or preformed with substantially the same shape as it will have after being assembled in a cavity as shown in FIG. 1. However, the wear take up bearing portion 14 is preformed or molded in a shape or configuration 14a which is larger than the shape to which it is compressed during the assembly. During the assembly it may be desirable to coat the bearing surfaces of the bearing portions 13 and 14 and surface of the ball 16 with a lubricant suitable for the particular resins being used.

The ball and socker joint 10 is assembled in the following manner. First, the bearing block 13 is inserted in the cavity 12 and positioned adjacent the inwardly extending flange 17. Then the ball stud 15 is inserted in the cavity until the surface of the ball engages the bearing surfaces of the portion 13. Next, the bearing half 14a is inserted into the position as shown in FIG. 2 with the cover plate 20. Compression is applied to the cover plate which compresses the bearing portion 14a into tight engagement with the ball 16 and the configuration illustrated in FIG. 1, and then the lip 18 of the housing 11 is peened or spun into the inwardly extending flange 19 to retain the cover plate 20 which holds the joint parts in their assembled relationship.

A modification of the bearing assembly, as best illustrated in FIG. 3 and generally indicated at 35, comprises a housing 11 having a cavity 12 in which is inserted a load supporting bearing portion 36 and a wear take up portion 14. The bearing portions 36 and 14 are held in the cavity 12 under compression by the closure plate 20 which is held in position by the inwardly peened or spun flange 19.

The load supporting bearing 36 has an extending lip or collar 37 which extends through the opening 38 defined by the flange 17 to engage the surface of the ball 16 and the adjacent reduced portion 22. The lip 37 provides a seal with the reduced portion 22 to prevent the entrance around the ball stud of contaminating moisture and dirt to the bearing surfaces of the ball 16 and the bearing portions 36 and 14. The lower portion of the bearing is sealed by a web 31 which is an integral part of the bearing block or portion 14.

The lip 37 provides a seal which may be used with a ball stud having a low angularity or movement, whereas the sealing member 24 as shown in FIG. 1 is used with a stud having a high degree of angularity in its movement. The wear take up portion 14 is made of the same materials as that of the portion 14 of the embodiment of FIG. 1 and the load supporting portion 36 is made up of the same resins as the block or portion 13 of the embodiment of FIG. 1.

The two embodiments of FIG. 1 and FIG. 3 illustrate a ball joint suspension in which the ball stud is placed in a tensile loading. If the ball is subjected to a compressive loading instead of tensile loading the bearing portions 13 and 14 would reverse their functions, i.e. the portion 14 would become the compression load supporting bearing portion and the portion 13 would then become the wear take up portion. With the reversal of the function, the portions would be made of a resin which has been found and described hereinbefore as satisfactory for the wear take up portion and the load supporting portion.

It should be understood that we wish to employ within the scope of the patent warranted hereon, all such embodiments as reasonably and properly come within the scope of our contribution to the art.

We claim as our invention:

1. In a ball and socket joint comprising a ball stud and a housing, said stud having a ball portion disposed in the housing and a stem portion projecting from the housing, and a preformed plastic bearing encapsulated in said housing and surrounding said ball portion, the improvement comprising said preformed bearing being in two portions, one a load supporting bearing portion of a resin having a low coefficient of friction and a high resistance to cold flow to prevent flow of said resin during application of a continuous load, the other portion being a wear takeup portion of a resin having a low coefficient of friction and a high resilience, said wear takeup portion being under compression so that by release of energy said wear takeup portion will expand and flow about said ball portion to maintain a tight engagement between the sufrace of said ball portion and the surface of said load supporting portion to compensate for any wear between the surfaces, said load supporting bearing constructed of a resin selected from the group consisting of nylon, acetal, pholyphenylene oxide and modified polyphenylene oxide, and said wear takeup portion constructed of a resin selected from the group consisting of high-density ethylene copolymer and polypropylene copolymers.

2. In a joint assembly having a first and second joint part in relative movable relationship and a preformed bearing surrounding the first part and encapsulated in the second part in a prestressed supporting relationship to both parts, the improvement of said bearing consisting of two portions, one of said portions acting as a load supporting bearing and being of a plastic material having a low coefficient of friction and a low degree of cold flow, said plastic material being a resin selected from the group consisting of nylon, acetal, polyphenylene oxide and modified polyphenylene oxide, the other of said portions acting as a wear takeup bearing of a plastic material having a low coefficient of friction and high resiliency, said wear takeup portion being a resin selected from the group consisting of high density ethylene copolymers and polypropylene copolymers, said wear takeup bearing adapted to expand to maintain said bearing portions in tight engagement with said joint parts.

References Cited

UNITED STATES PATENTS

| | | |
|---|---|---|
| 2,361,025 | 10/1944 | Graham et al. |
| 3,168,339 | 2/1965 | Townsend _____ 287—87 |
| 3,197,842 | 8/1965 | Parker. |
| 3,216,754 | 11/1965 | Smith et al. _____ 287—87 |
| 3,249,375 | 5/1966 | Herbenar. |
| 3,257,133 | 6/1966 | Wight _____ 287—87 |
| 3,355,199 | 11/1967 | Melton et al. |

FOREIGN PATENTS

| | | |
|---|---|---|
| 840,176 | 7/1960 | Great Britain. |
| 1,098,381 | 1/1961 | Germany. |

DAVID J. WILLIAMOWSKY, Primary Examiner

A. V. KUNDRAT, Assistant Examiner